(12) United States Patent
Jung et al.

(10) Patent No.: US 10,502,078 B2
(45) Date of Patent: Dec. 10, 2019

(54) GAS TURBINE

(71) Applicant: DOOSAN HEAVY INDUSTRIES & CONSTRUCTION CO., LTD, Changwon-si, Gyeongsangnam-do (KR)

(72) Inventors: Sung Chul Jung, Daejeon (KR); Young Chan Yang, Changwon-si (KR)

(73) Assignee: Doosan Heavy Industries Construction Co., Ltd., Gyeongsangnam-do (KR)

(*) Notice: Subject to any disclaimer, the term of this patent is extended or adjusted under 35 U.S.C. 154(b) by 134 days.

(21) Appl. No.: 15/842,195

(22) Filed: Dec. 14, 2017

(65) Prior Publication Data
US 2018/0171810 A1 Jun. 21, 2018

(30) Foreign Application Priority Data
Dec. 20, 2016 (KR) .................. 10-2016-0174794

(51) Int. Cl.
F01D 9/06 (2006.01)
F01D 25/28 (2006.01)
(Continued)

(52) U.S. Cl.
CPC ............. F01D 9/065 (2013.01); F01D 25/16 (2013.01); F01D 25/162 (2013.01); F01D 25/28 (2013.01);
(Continued)

(58) Field of Classification Search
CPC ........ F01D 9/065; F01D 25/16; F01D 25/162; F01D 25/28; F02C 7/141
(Continued)

(56) References Cited

U.S. PATENT DOCUMENTS 3,807,892 A * 4/1974 Frei .................. F01D 5/187
415/116
5,537,814 A * 7/1996 Nastuk ................ F01D 5/066
60/796

(Continued)

FOREIGN PATENT DOCUMENTS

EP 3070273 A1 9/2016
EP 3081761 A1 10/2016
(Continued)

OTHER PUBLICATIONS

A Japanese Office Action dated Nov. 27, 2018 in connection with Japanese Patent Application No. 2017-238655 which corresponds to the above-referenced U.S. application.
(Continued)

Primary Examiner — Nathaniel E Wiehe
Assistant Examiner — David Whittaker
(74) Attorney, Agent, or Firm — Invenstone Patent, LLC

(57) ABSTRACT

A gas turbine includes a bearing housing surrounding an outside of a tie rod provided on the turbine. One end of a power strut is connected to an outside of the bearing housing, and the other end is radially arranged outwards. A cooling-air supply unit supplies cooling air to the power strut. A heat exchange unit is disposed in the power strut to perform a heat exchange process with cooling air supplied through the cooling-air supply unit. A ring-shaped support frame is connected to the other end of the power strut.

15 Claims, 7 Drawing Sheets

(51) Int. Cl.
*F01D 25/16* (2006.01)
*F02C 7/141* (2006.01)
*F01D 5/18* (2006.01)

(52) U.S. Cl.
CPC .............. *F02C 7/141* (2013.01); *F01D 5/188* (2013.01); *F05D 2260/213* (2013.01)

(58) Field of Classification Search
USPC ......................................................... 415/116
See application file for complete search history.

(56) References Cited

U.S. PATENT DOCUMENTS

| | | | |
|---|---|---|---|
| 6,637,208 B2 * | 10/2003 | Horner | F02C 7/143 |
| | | | 415/115 |
| 9,316,153 B2 * | 4/2016 | Patat | F01D 9/065 |
| 9,476,313 B2 * | 10/2016 | Caprario | F01D 9/065 |
| 2013/0084172 A1 | 4/2013 | Kasibhotla et al. | |
| 2014/0205447 A1 | 7/2014 | Patat et al. | |
| 2015/0337682 A1 | 11/2015 | Yeager et al. | |
| 2017/0067365 A1 * | 3/2017 | Mukhopadhyay | F01D 9/065 |
| 2017/0204734 A1 * | 7/2017 | Groves, II | F01D 9/065 |

FOREIGN PATENT DOCUMENTS

| | | |
|---|---|---|
| EP | 3085899 A1 | 10/2016 |
| JP | 2003301701 A | 10/2003 |
| JP | 2014-521885 A | 8/2014 |
| JP | 2015-528890 A | 10/2015 |
| JP | 2016-505108 A | 2/2016 |
| JP | 2016118199 A | 6/2016 |
| KR | 20150008749 A | 1/2015 |
| WO | 2014/051691 A1 | 4/2014 |
| WO | 2016/177644 A1 | 11/2016 |

OTHER PUBLICATIONS

A Korean Office Action issued by the Korean Intellectual Property Office dated Dec. 20, 2017 in connection with Korean patent application No. 10-2016-0174794.

* cited by examiner

GAS TURBINE

CROSS-REFERENCE TO RELATED APPLICATION

This application claims priority to Korean Patent Application No. 10-2016-0174794, filed on Dec. 20, 2016, the disclosure of which is incorporated herein by reference in its entirety.

BACKGROUND

Exemplary embodiments of the present disclosure relate to a power strut provided on a turbine, and more particularly, to a gas turbine intended to reduce or minimize the deformation and damage of components due to hot gas, through an internal structure of the power strut and a passage through which cooling air flows.

In general, a gas turbine may be a kind of internal combustion engine, including a turbine which converts thermal energy into mechanical energy by expanding high-temperature and high-pressure combustion gas generated by combusting a mixture of fuel with air compressed to a high pressure by a compressor. Each of the compressor and the turbine obtains rotational force from a rotor unit.

The gas turbine includes a plurality of compressor rotor disks to form the rotor unit or the compressor or the turbine, each of which includes a plurality of compressor blades arranged around an outer circumferential surface thereof.

A tie bolt is provided to couple the rotor disks with each other and enable them to integrally rotate and to couple a plurality of turbine rotor disks with each other so that the turbine rotor disks each having an outer circumferential surface around which a plurality turbine blades is arranged can be integrally rotated.

The tie bolt has a configuration in which it extends through a central portion of the rotor disk of the compressor and a central portion of the rotor disk of the turbine and couples the rotor disk of the compressor with the rotor disk of the turbine.

Such a gas turbine is provided with a power strut to support a rotor. Preferably, the power strut protects neighboring components from high-temperature hot gas while simultaneously supporting the rotor stably.

However, the conventional power strut is problematic in that an inside thereof is cooled but an outside thereof is not cooled separately.

Furthermore, when the rotor rotates, the rotor may be undesirably pushed to a rear end of the turbine due to high-pressure hot gas passing through a combustor.

BRIEF SUMMARY

An object of the present disclosure is to provide a gas turbine that is configured to stably cool a power strut provided on the turbine and a support frame.

Other objects and advantages of the present disclosure can be understood by the following description, and become apparent with reference to the embodiments of the present disclosure.

In accordance with one aspect of the present disclosure, a gas turbine may include a bearing housing surrounding an outside of a tie rod provided on the turbine; a power strut, a first end of the power strut being connected to an outside of the bearing housing, a second end of the power strut being radially arranged outwards; a cooling-air supply unit supplying cooling air to the power strut; a heat exchange unit disposed in the power strut to perform a heat exchange process with cooling air supplied through the cooling-air supply unit; and a ring-shaped support frame connected to the second end of the power strut.

In accordance with another aspect of the present disclosure, the heat exchange unit may include ribs that may protrude in the power strut to face each other.

In accordance with yet another aspect of the present disclosure, the ribs may be inclined at a gradient that may be similar or equal to a gradient at which the power strut may be inclined towards the support frame.

A protruding amount of each of the ribs may increase from an outside in a radial direction of the power strut to an inside in the radial direction at which the bearing housing may be located.

The gas turbine may further include a cover housing provided outside the power strut to surround the power strut.

A first cooling passage may be defined between an outside of the power strut and an inside of the cover housing.

An opening may be formed in the power strut such that some of the cooling air supplied to the power strut may be supplied to the first cooling passage.

The opening may include first openings formed in left and right side surfaces of the power strut, respectively, when viewing a longitudinal cross-section of the power strut from a side; and second openings formed under the first openings to be spaced apart therefrom.

Each of the first openings may be formed to be inclined towards an upper portion of the cover housing, while each of the second openings may be formed to be inclined towards a lower portion of the cover housing.

After the cooling air may be supplied through the first openings, some of the cooling air may move from a junction between the outside of the power strut and an inside of the support frame in the first cooling passage towards second cooling passages that may be formed, respectively, towards a front and a rear of the tie rod in an axial direction thereof. A remaining cooling air may flow from a junction between an inside of the power strut and an outside of an inner casing surrounding the outside of the bearing housing to third cooling passages that may be formed, respectively, towards the front and rear of the tie rod in the axial direction thereof. The cooling air supplied through the first and second openings may be supplied to the second and third cooling passages, respectively.

The first cooling passage may be larger in diameter than the second and third cooling passages.

The cover housing may include on an inner wall thereof a guide unit to guide the cooling air passing through the first and second openings to the second and third cooling passages, respectively.

The guide unit may include a horizontal part that may be coupled at one end thereof to an inner wall of the power strut and may horizontally extend towards a center of the power strut; and a rounded part that may be formed by rounding an end of the horizontal part towards each of the second and third cooling passages.

If the cooling air supplied to the third cooling passage is supplied in an axial direction of a rotor, the rotor may be pressed towards a compressor provided on the turbine.

The cooling-air supply unit may supply high-pressure compressed air that may be compressed in the compressor of the turbine.

Each of the ribs may be made of a material having a high heat transfer coefficient.

It is to be understood that both the foregoing general description and the following detailed description are exemplary and explanatory and are intended to provide further explanation of the various embodiments.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
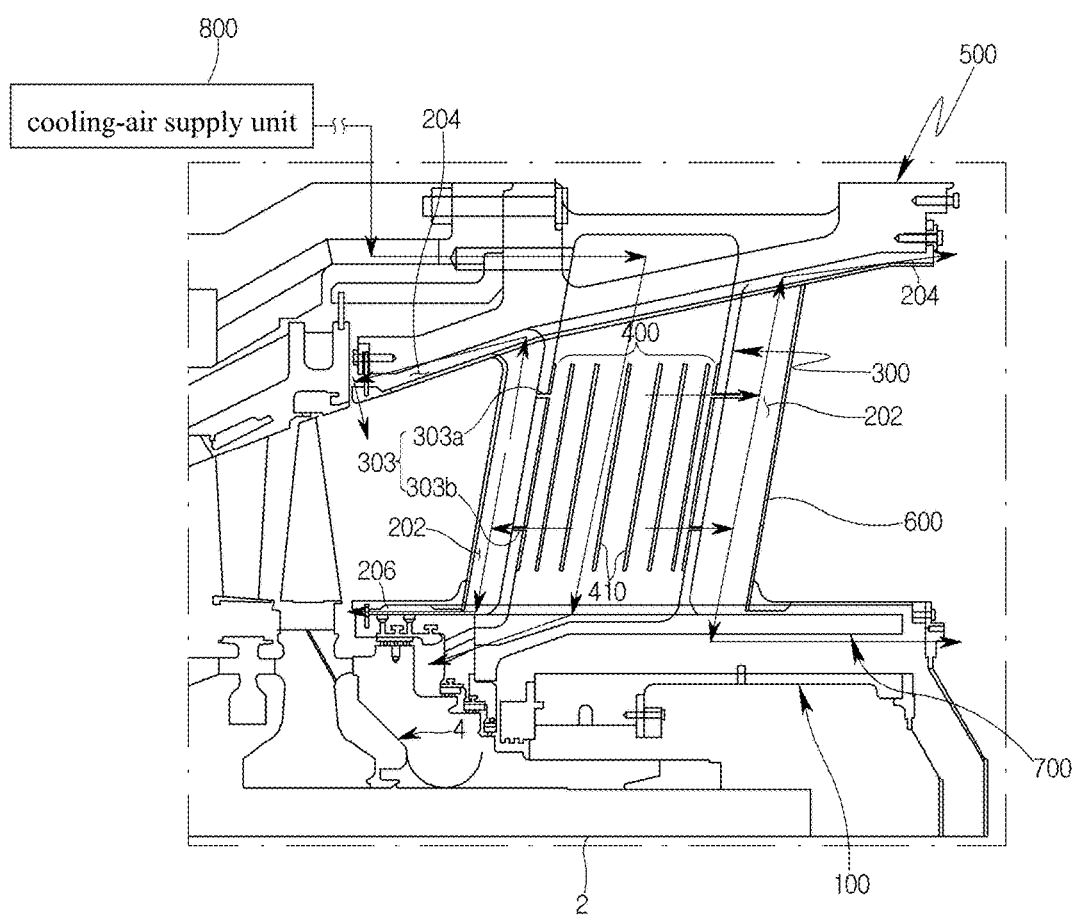
FIG. 1 is a view illustrating the arrangement of a power strut and a support frame according to an embodiment.

Embodiments of the present disclosure are described in detail below with reference to the accompanying drawings. FIG. 1 is a view illustrating the arrangement of a power strut and a support frame according to an embodiment, FIG. 2 is a view illustrating the arrangement of the power strut and the support frame according to the embodiment, and FIG. 3 is a cross-sectional view illustrating a power strut provided on a gas turbine according to the embodiment.

Figure 2:
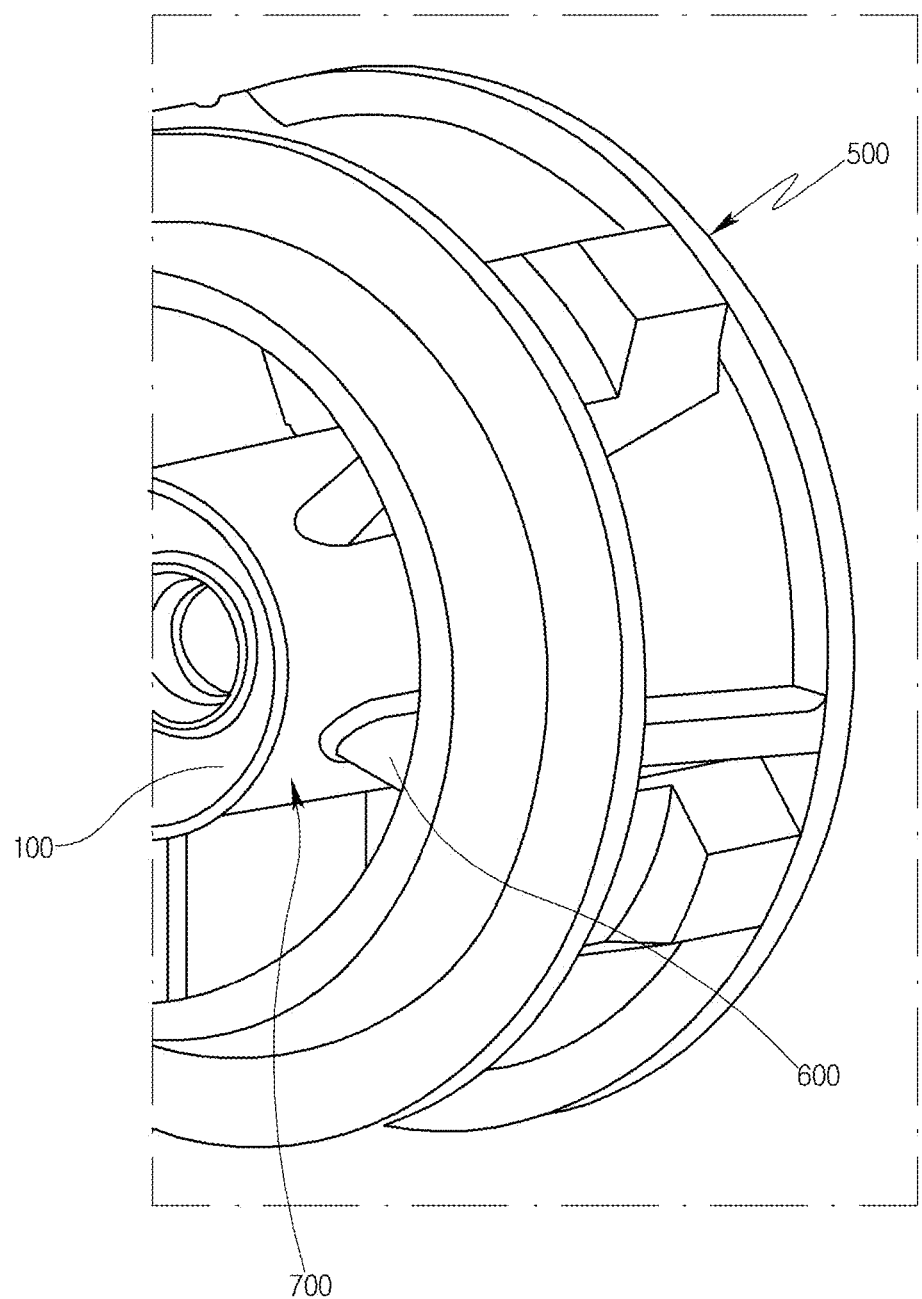
FIG. 2 is a view illustrating the arrangement of the power strut and the support frame according to the embodiment.
Figure 3:
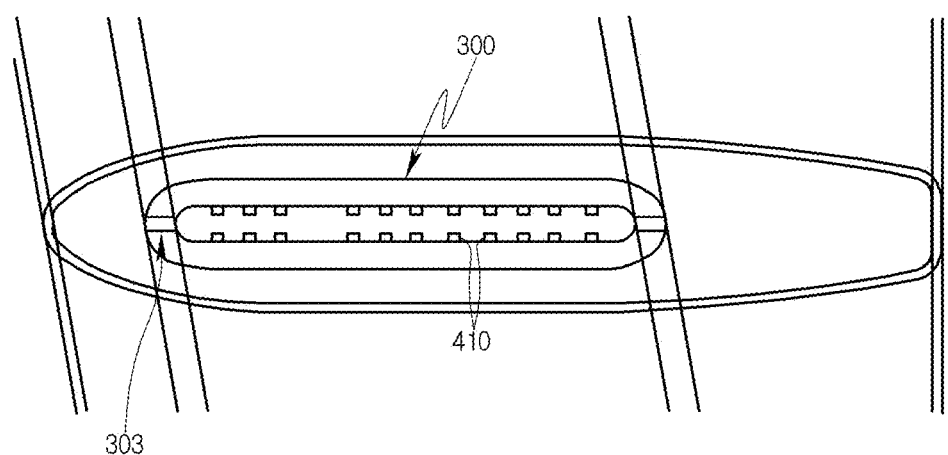
FIG. 3 is a cross-sectional view illustrating a power strut provided on a gas turbine according to the embodiment.

Referring to FIGS. 1 to 3, the gas turbine according to this embodiment includes a bearing housing 100 that surrounds an outside of a tie rod 2 provided on the turbine. One end of a power strut 300 is connected to an outside of the bearing housing 100, and the other end is radially arranged outwards. A cooling-air supply unit 800 supplies cooling air to the power strut 300. A heat exchange unit 400 is disposed in the power strut 300 to perform a heat exchange process with cooling air supplied through the cooling-air supply unit 800. A ring-shaped support frame 500 is connected to the other end of the power strut 300.

The bearing housing 100 is configured to surround a bearing that rotates in a rolling contact state with the outside of the tie rod 2.

The bearing reduces friction of the rotating tie rod 2 and bears a load, thus ensuring stable rotation and operation of the tie rod 2.

The bearing housing 100 has a cylindrical shape, surrounds the tie rod 2, and axially extends a predetermined length. A plurality of power struts 300 are radially arranged on an outer circumference of the bearing housing 100.

When viewed from a back in an axial direction of the tie rod 2, each power strut 300 extends perpendicularly outside the bearing housing 100.

The power strut 300 has on an extended outer end thereof the support frame 500 that is concentric with the bearing housing 100 and has a cylindrical shape. The power strut 300 is coupled at both ends thereof between the bearing housing 100 and the support frame 500 and may stably support a plurality of rotors 4.

When viewing a cross-section of the power strut 300 from above, the power strut is formed in the shape of an ellipse whose major axis extends in an axial direction of the bearing housing 100, and has a hollow space therein, with the heat exchange unit 400 being provided on an inner wall thereof.

The heat exchange unit 400 is provided to improve cooling performance by increasing a contact area with cooling air supplied therein. By way of example, ribs 410 that protrude in the power strut 300 to face each other are formed outside the tie rod 2 in a radial direction thereof.

The ribs 410 are inclined at a gradient that is similar or equal to a gradient at which the power strut 300 is inclined towards the support frame 500. Since the power strut 300 is provided outside the bearing housing 100 to extend radially, the rib 410 also extends at a gradient corresponding to the gradient of the power strut 300.

The power strut 300 extends in the form of an elliptical cross-section, and the plurality of ribs 410 is arranged in the axial direction of the bearing housing 100 to be spaced apart from each other at a predetermined interval.

As the number of the installed ribs 410 increases, the contact area with the cooling air increases and cooling efficiency is enhanced. Thus, the individual rib is preferably formed to have a small size. For example, the ribs 410 may be arranged such that an interval of the ribs is reduced from a center in the power strut 300 towards left and right walls thereof when seen in the drawings.

As such, if the interval of the ribs is reduced towards the left and right walls of the power strut 300 to allow the cooling air to stably flow through a first cooling passage 202 in an opening 303 that will be described later, the cooling air may stably flow towards the opening 303 and second and third cooling passages 204 and 206.

The ribs 410 are formed in the shape of a rectangular parallelepiped, for example, and are arranged in the power strut 300 to face each other. A protruding length of each rib 410 is shorter than spacing between the facing ribs.

When the cooling air moves through the inside of the power strut 300, the heat exchange process may occur between the cooling air and the ribs 410 without reducing a flow rate or generating unnecessary turbulence. Thus, it is preferable to define a space in which the cooling air may stably flow.

For example, the ribs 410 are arranged to be in close contact with the inner wall of the power strut 300, thus allowing the cooling air to stably flow. The cooling air flows while being, for example, uniformly diffused throughout the center of the power strut 300 and regions delimited by the ribs 410. In this case, the power strut 300 that rises in temperature due to heat transferred from hot gas may efficiently be cooled, thus enhancing the cooling efficiency.

Figure 4:
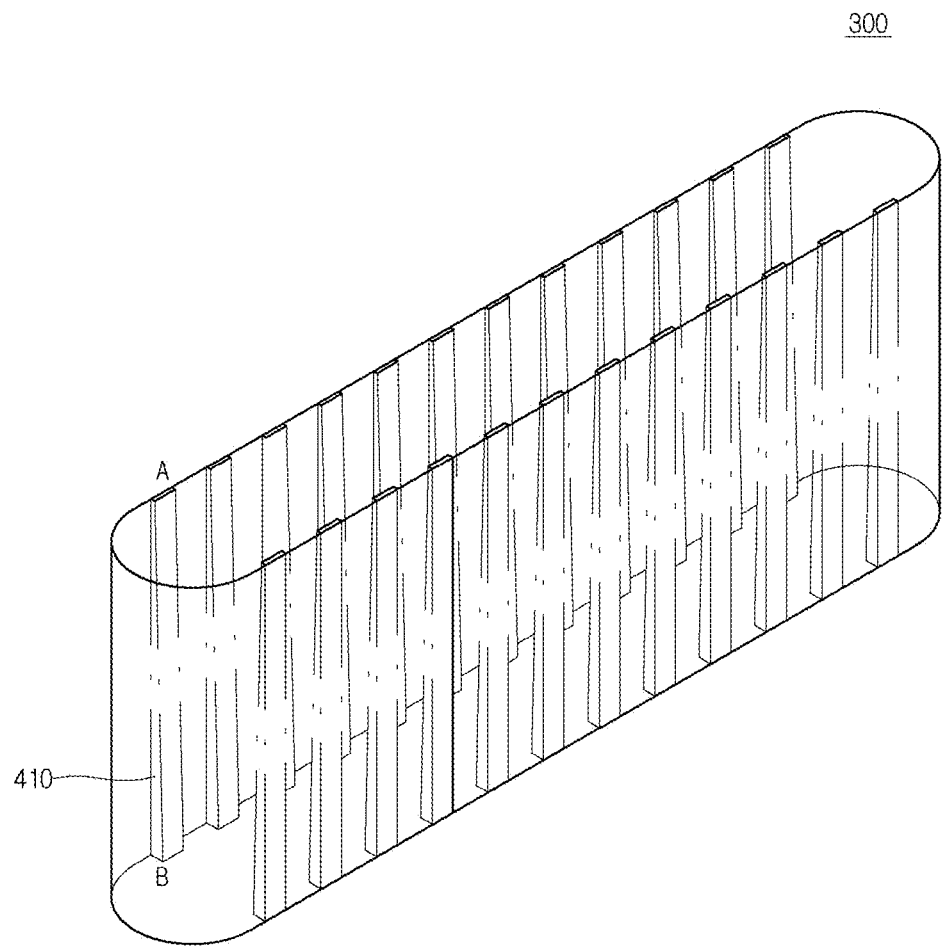
FIG. 4 is a view illustrating a rib provided on a power strut according to another embodiment.

Referring to FIG. 4, a protruding amount of each rib 410 according to this embodiment may be increased from an outside in a radial direction of the power strut 300 to an inside in the radial direction at which the bearing housing 100 is located.

The cooling air is supplied from the power strut 300 towards the bearing housing 100. In this case, the flow of the cooling air may be changed in the form of turbulence at a position where the ribs 410 are located, by the speed and pressure of the cooling air.

The turbulence of the cooling air may be produced in the flow of fluid. However, in order to reduce or minimize the turbulence, the protruding amount of the rib 410 may increase towards the inside in the radial direction where the bearing housing 100 is located.

In this case, since the protruding amount of the rib 410 is reduced at one end (position A) of the rib 410 with which the cooling air initially comes into contact, unnecessary friction may be reduced or minimized between the cooling air and the ribs 410. Furthermore, a contact area with the cooling air is increased at the other end (position B) of the rib 410 with which the cooling air later comes into contact, thus efficiently performing a cooling operation through heat exchange.

Therefore, it is possible to stably move the cooling air while simultaneously enhancing heat exchange efficiency, even when the power strut 100 is lengthened.

This embodiment further includes a cover housing 600 that is provided outside the power strut 300 to surround the power strut. The first cooling passage 202 is defined between the outside of the power strut 300 and the inside of the cover housing 600.

The cover housing 600 is provided to physically protect the power strut 300 and to reduce or minimize the heating of the power strut by hot gas of high temperature.

The cover housing 600 is coupled at one end thereof to the outside of the bearing housing 100, and coupled at the other end to the inside of the support frame 500. The first cooling passage 202 is formed in the cover housing so that the hot gas is not in direct contact with the power strut 300.

The first cooling passage 202 extends from the bearing housing 100 towards the support frame 500. Since a space is defined between the first cooling passage and an outer circumferential surface of the power strut 300, it is possible to provide a space into which the cooling air performing the heat exchange process with the hot gas of high temperature is introduced. Thus, the first cooling passage is advantageous in terms of cooling.

Furthermore, the opening 303 is formed in the power strut 300 such that some of the cooling air supplied to the power strut 300 is fed to the first cooling passage 202.

Figure 5:
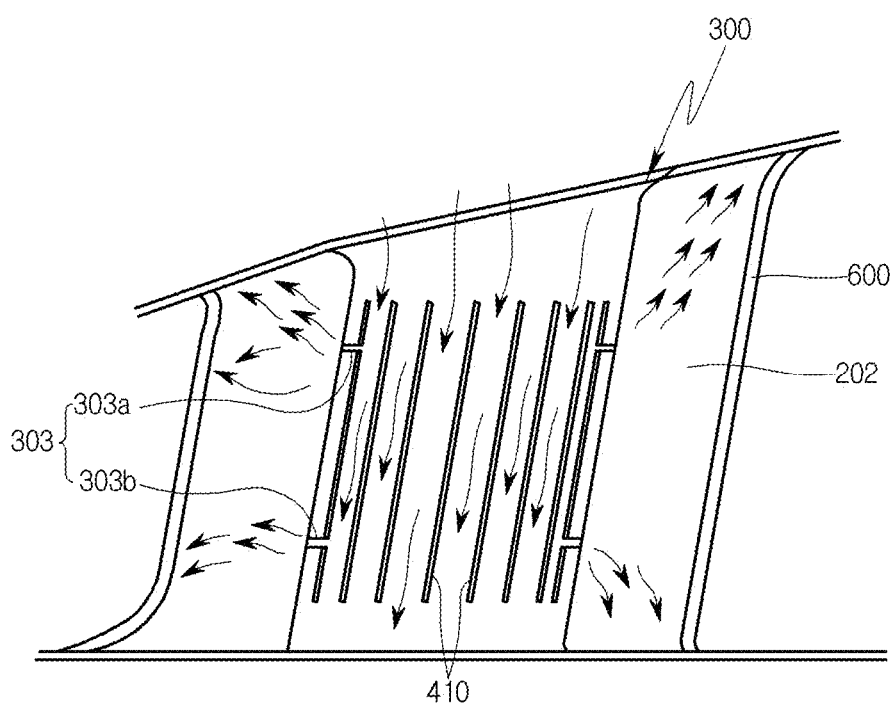
FIGS. 5 and 6 are sectional views illustrating an opening according to another embodiment.

Referring to FIG. 5, the opening 303 according to this embodiment includes first openings 303*a* that are formed in left and right side surfaces of the power strut 300, respectively, when viewing a longitudinal cross-section of the power strut from a side, and second openings 303*b* that are formed under the first openings 303*a* to be spaced apart therefrom.

The first and second openings 303*a* and 303*b* may be formed to have the same diameter. Alternatively, the first and second openings may be formed to have different diameters, in order to supply a larger amount of cooling air to a position where a larger amount of cooling air is required.

The first and second openings 303*a* and 303*b* may be horizontally formed to be perpendicular to the first cooling passage 202. Some of the cooling air flows through the first and second openings 303*a* and 303*b*.

Figure 6:
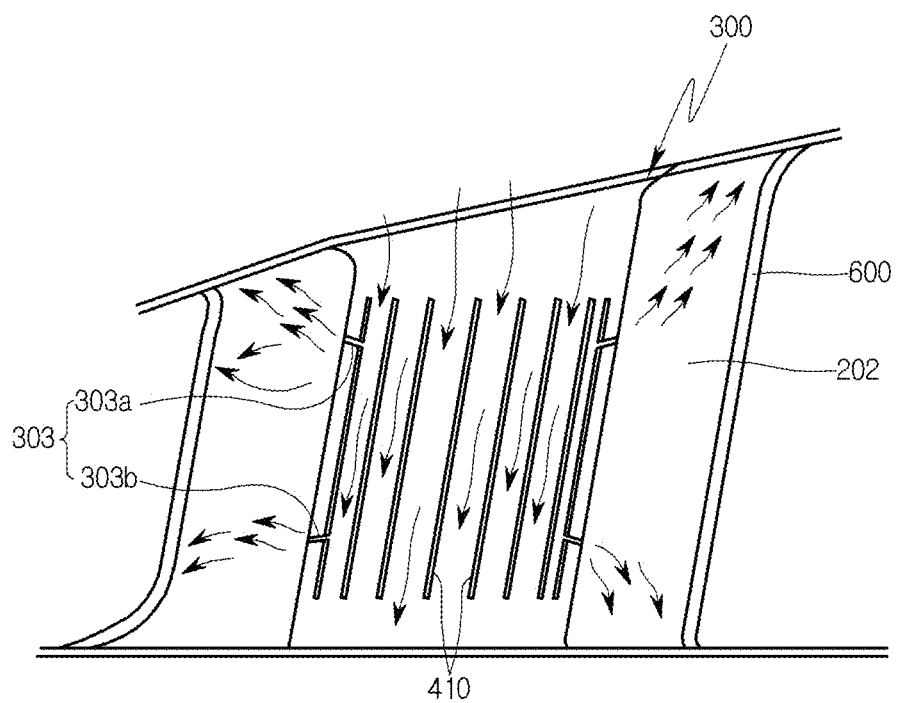

Referring to FIG. 1 or 6, according to another embodiment, the first opening 303*a* is formed to be inclined towards an upper portion of the cover housing 600, while the second opening 303*b* is formed to be inclined towards a lower portion of the cover housing 600.

When the cooling air flows through the first cooling passage 202, the cooling air collides with the inner surface of the cover housing 600. Thus, the cooling air may flow in a direction different from an intended direction.

According to the present disclosure, in order to guide the cooling air in a specific moving direction, the first and second openings 303*a* and 303*b* are opened towards specific positions, thus allowing the cooling air to stably flow while simultaneously enhancing the cooling efficiency of the power strut 300.

Particularly, the present embodiment allows the inside of the power strut 300 to be cooled via the ribs 410, and allows the outside of the power strut to be cooled via the first cooling passage 202 or the second and third cooling passages 204 and 206, thus efficiently cooling the power strut.

After the cooling air is supplied through the first opening 303*a*, some of the cooling air moves from a junction between the outside of the power strut 300 and the inside of the support frame 500 in the first cooling passage 202 towards the second cooling passages 204 that are formed, respectively, towards the front and rear of the tie rod 2 in the axial direction thereof.

Furthermore, the remaining cooling air performs the cooling operation while flowing from a junction between the inside of the power strut 300 and the outside of an inner casing 700 surrounding the outside of the bearing housing 100 to the third cooling passages 206 that are formed, respectively, towards the front and rear of the tie rod 2 in the axial direction thereof.

Since the second and third cooling passages 204 and 206 have areas smaller than an open section of the first cooling passage 202, the cooling air may be rapidly moved to the second and third cooling passages 204 and 206.

Since the second and third cooling passages 204 and 206 are provided to reduce or prevent damage due to the hot gas of high temperature, it is possible to reduce or minimize the exposure of the power strut 300, the support frame 500 and the rotor 4 to heat resulting from the heat exchange with the hot gas of high temperature or to reduce or minimize deformation caused by heat transfer.

Furthermore, since the cooling air flows in the axial direction of the tie rod 2 along the second and third cooling passages 204 and 206, it is possible to perform the cooling operation while surrounding a part of the tie rod 2 in the axial direction thereof.

As the cooling air flows through the second cooling passage 204 to a path where the hot gas moves, the cooling operation is performed. If the cooling air supplied to the third cooling passage 206 is supplied in the axial direction of the rotor 4, the rotor 4 may be pressed towards a compressor provided on the turbine.

A pressure is exerted on the rotor 4 in the axial direction towards the power strut 300 by the hot gas. Thereby, an abnormal pressing force may be generated to push the rotor 4 to a rear portion in which the power strut 300 is situated.

In order to address this problem, according to the present disclosure, some of the cooling air is supplied to the rotor 4 to support the rotor 4 towards the compressor and thereby limit or prevent the rotor 4 from being pushed to the above-mentioned position.

Therefore, it is possible to perform the cooling operation while simultaneously supporting the rotor 4 using the cooling air.

According to this embodiment, the first cooling passage 202 is larger in diameter than the second and third cooling passages 204 and 206. Since the first cooling passage 202 serves as a main passage into which the cooling air flows through the first and second openings 303*a* and 303*b*, a speed at which the cooling air flows towards the second and third cooling passages 204 and 206 may be increased.

Figure 7:
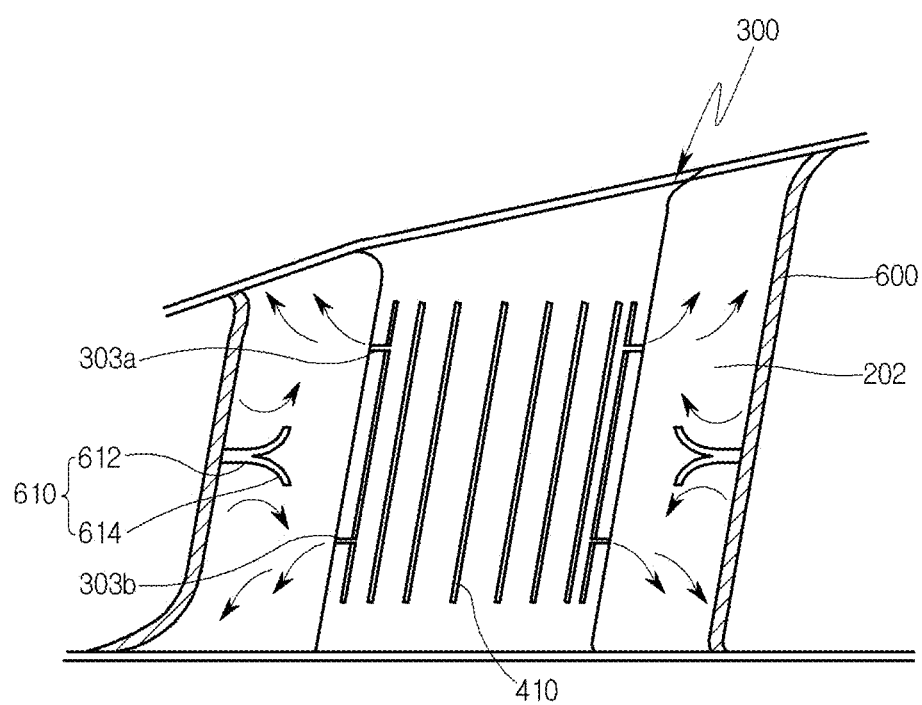
FIG. 7 is a view illustrating a guide unit according to an embodiment.

Referring to FIG. 7, the cover housing 600 according to an embodiment has on an inner wall thereof a guide unit 610 to guide the cooling air passing through the first and second openings 303*a* and 303*b* to the second and third cooling passages 204 and 206, respectively.

The guide unit 610 includes a horizontal part 612 that is coupled at one end thereof to an inner wall of the cover housing 600 and horizontally extends towards the center of the power strut 300, and a rounded part 614 that is formed by rounding an end of the horizontal part 612 towards each of the second and third cooling passages 204 and 206.

If the cooling air is discharged through the first and second openings 303a and 303b, the cooling air flows in directions shown by arrows. However, since the first cooling passage 202 extends such that its length is larger than its width, all the cooling air may not flow towards the second and third cooling passages 204 and 206 but some may circulate in the cover housing 600.

In this case, the cooling air flows along the horizontal part 612 to the rounded parts 614. The flow direction of the cooling air may be easily changed from the rounded parts 614 to the second cooling passage 204 and the third cooling passage 206, respectively. Consequently, most of the cooling air flows in a desired direction.

Therefore, it is possible to stably cool the rotor 4 as well as the power strut 300 and the support frame 500.

The cooling-air supply unit 800 according to the present embodiment supplies the high-pressure compressed air that is compressed in the compressor of the turbine, and a pipe is separately provided to supply the compressed air that is compressed in the compressor, thus communicating with the outside of the support frame 500.

In addition, a cooling-air introduction passage is circumferentially formed on the support frame 500 to receive the compressed air from the cooling-air supply unit 800, and the cooling-air introduction passage communicates with the inside of the power strut 300.

The rib 410 is made of a material having a high heat transfer coefficient. In this case, heat transfer ability is improved and cooling efficiency is improved, so that it is possible to drop the temperature of the hot gas.

As described above, embodiments of the present disclosure allow both an inside and an outside of a power strut to be simultaneously cooled, thus reducing o minimizing thermal deformation caused by hot gas and stably supporting a rotor.

Embodiments of the present disclosure allow a rotor to be supported in an axial direction of a tie rod, thus reducing or minimizing the pushing of the rotor.

Embodiments of the present disclosure provide a compact design for cooling a turbine, thus allowing various cooling modes to be applied.

Although the preferred embodiments have been disclosed for illustrative purposes, those skilled in the art will appreciate that various modifications, additions and substitutions are possible, without departing from the scope and spirit of the accompanying claims and their equivalents. Furthermore, the above advantages and features are provided in described embodiments, but shall not limit the application of such issued claims to processes and structures accomplishing any or all of the above advantages.

What is claimed is:

1. A gas turbine comprising:
   a support frame having an annular shape;
   a bearing housing concentrically disposed within the annular shape of the support frame and configured to at least partially surround a tie rod of the turbine;
   a power strut having an interior space in which cooling air flows and further including a first end coupled to an outside of the bearing housing and a second end radially arranged outwardly of the first end and coupled to an inside of the support frame; and
   a heat exchange unit formed as a plurality of ribs protruding from an inner wall of the power strut to be disposed in the interior space of the power strut and configured to perform a heat exchange between the inner wall and the cooling air,
   wherein each rib of the plurality of ribs protrudes a variable distance from the inner wall and includes a first end formed at a first radially disposed extreme of the rib and a second end formed at a second radially disposed extreme of the rib opposite the first end, the variable distance increasing gradually from the first end to the second end.

2. The gas turbine according to claim 1, wherein the plurality of ribs include:
   a first set of ribs formed on a first side of the inner wall; and
   a second set of ribs formed on a second side of the inner wall, the second side facing the first side, and
   wherein the plurality of ribs are arranged on the first and second sides of the inner wall such that each rib of the first set of ribs faces a corresponding rib of the second set of ribs.

3. The gas turbine according to claim 1, wherein the power strut is inclined at a predetermined gradient from the bearing housing to the support frame, and wherein the plurality of ribs extend from the bearing housing to the support frame in parallel with the predetermined gradient of the power strut.

4. The gas turbine according to claim 1, wherein the first end is disposed at an outwardly radial position with respect to the bearing housing and the second end is disposed at an inwardly radial position with respect to the bearing housing.

5. The gas turbine according to claim 1, further comprising a cover external to and at least partially surrounding the power strut.

6. The gas turbine according to claim 5, wherein a first cooling passage is provided between an outside of the power strut and an inside of the cover.

7. The gas turbine according to claim 6, wherein an opening is defined in the power strut operable to supply at least some of the cooling air supplied to the power strut to the first cooling passage.

8. The gas turbine according to claim 7, wherein the opening includes:
   first openings defined in respective side surfaces of the power strut when viewing a longitudinal cross-section of the power strut, and
   second openings defined below and spaced apart from the first openings.

9. The gas turbine according to claim 8, wherein
   each of the first openings includes an incline towards an upper portion of the cover, and
   each of the second openings includes an incline towards a lower portion of the cover.

10. The gas turbine according to claim 8, wherein
    a first junction disposed between the outside of the power strut and an inside of the support frame in the first cooling passage is configured to receive first air supplied through the first openings and direct the received first air towards second cooling passages that are defined, respectively, towards a front and rear axial positions of the tie rod,
    a second junction disposed between an inside of the power strut and an outside of an inner casing surrounding the outside of the bearing housing is configured to receive second air supplied through the first openings and direct the second received air to third cooling passages that are formed, respectively, towards the front and rear axial positions of the tie rod, and
    the first and second openings are operatively coupled to the second and third cooling passages, respectively, such that the cooling air supplied through the first and second openings is supplied to the second and third cooling passages.

11. The gas turbine according to claim 10, wherein a diameter of the first cooling passage is larger than a diameter of the second or third cooling passage.

12. The gas turbine according to claim 10, wherein an inner wall of the cover includes a guide configured to guide the cooling air passing through the first and second openings to the second and third cooling passages, respectively.

13. The gas turbine according to claim 12, wherein the guide includes:
   a horizontal part that includes a first end coupled to an inner wall of the cover and horizontally extends towards a center of the power strut, and
   a rounded part disposed at a second end of the horizontal part towards each of the second and third cooling passages.

14. The gas turbine according to claim 10, wherein the third cooling passage is configured such that cooling air supplied to the third cooling passage in an axial direction of a rotor presses the rotor towards a compressor of the turbine.

15. The gas turbine according to claim 1, wherein the cooling air includes high-pressure compressed air that is compressed in a compressor of the turbine.

* * * * *